(12) United States Patent
Qiu

(10) Patent No.: US 12,250,923 B2
(45) Date of Patent: Mar. 18, 2025

(54) PET TRAVEL CARRIER

(71) Applicant: JIANGSU ZHONGHENG PET ARTICLES JOINT-STOCK CO., LTD., Yancheng (CN)

(72) Inventor: Bin Qiu, Yancheng (CN)

(73) Assignee: JIANGSU ZHONGCHENG PET ARTICLES JOINT-STOCK CO, LTD., Yancheng (CN)

( * ) Notice: Subject to any disclaimer, the term of this patent is extended or adjusted under 35 U.S.C. 154(b) by 26 days.

(21) Appl. No.: 18/155,783

(22) Filed: Jan. 18, 2023

(65) Prior Publication Data
US 2023/0371467 A1 Nov. 23, 2023

(30) Foreign Application Priority Data

May 20, 2022 (CN) .......................... 202221235137.1

(51) Int. Cl.
*A01K 1/02* (2006.01)
(52) U.S. Cl.
CPC .................................. *A01K 1/0245* (2013.01)
(58) Field of Classification Search
CPC ..................................................... A01K 1/0245
See application file for complete search history.

(56) References Cited

U.S. PATENT DOCUMENTS

| | | | | |
|---|---|---|---|---|
| 3,316,565 A * | 5/1967 | Knowlton | ............ | A47D 13/027 5/97 |
| 3,490,417 A * | 1/1970 | Swinney | ............ | A01K 1/0245 206/508 |
| 3,771,686 A * | 11/1973 | Brison | ............ | B65D 11/12 215/400 |
| 4,696,257 A * | 9/1987 | Neary | ............ | A01K 1/0114 119/500 |
| 4,852,520 A * | 8/1989 | Goetz | ............ | A01K 1/0245 119/497 |
| 5,148,771 A * | 9/1992 | Schuett | ............ | A01K 1/01 119/479 |
| 5,181,480 A * | 1/1993 | Dabolt | ............ | A01K 1/011 119/161 |
| 5,253,612 A * | 10/1993 | Goetz | ............ | A01K 1/0245 119/497 |
| 5,280,767 A * | 1/1994 | Goetz | ............ | A01K 1/0245 119/496 |
| 5,357,900 A * | 10/1994 | Ho | ............ | A01K 1/0245 119/497 |
| 5,435,266 A * | 7/1995 | Carson | ............ | A01K 1/0356 119/475 |

(Continued)

*Primary Examiner* — Jessica B Wong

(57) ABSTRACT

A pet travel carrier includes an upper box, a lower box, and a base. The upper box and the lower box are detachably fixed and connected by a box fixing and connecting structure to form a hollow travel carrier body. The lower box and the base are detachably connected by a base connecting structure to form a travel carrier bottom structure. A door is arranged to extend through a side of the upper box and a side of the lower box. A tray which is removable is arranged on the base. A perforated plate is arranged at a lower part of the lower box exactly facing the tray. Rollers are arranged at a lower part of the base. The use of the tenon and mortise structure in combination with connectors makes the pet travel carrier of the present disclosure easy to assemble and firm.

10 Claims, 6 Drawing Sheets

(56) References Cited

U.S. PATENT DOCUMENTS

| | | | |
|---|---|---|---|
| 5,467,734 A * | 11/1995 | Ho | A01K 1/0236 119/497 |
| 5,471,950 A * | 12/1995 | White | A01K 1/0245 119/497 |
| 5,549,073 A * | 8/1996 | Askins | A01K 1/033 119/474 |
| 5,701,843 A * | 12/1997 | Lazides | A01K 1/0245 119/512 |
| 5,988,110 A * | 11/1999 | Peterson | A01K 31/06 119/479 |
| 6,131,534 A * | 10/2000 | Axelrod | A01K 1/0245 119/497 |
| 6,182,611 B1 * | 2/2001 | Marchioro | A01K 1/0245 D30/114 |
| 6,230,656 B1 * | 5/2001 | Walach | A01K 1/0236 119/453 |
| 6,257,171 B1 * | 7/2001 | Rivard | A01K 1/031 119/419 |
| 6,267,080 B1 * | 7/2001 | Roy | A01K 1/02 119/453 |
| 6,523,499 B1 * | 2/2003 | Chrisco | A01K 1/0245 119/496 |
| 7,036,458 B1 * | 5/2006 | Stornant | A01K 1/011 119/458 |
| 10,517,263 B1 * | 12/2019 | Perez | A01K 1/011 |
| 10,842,126 B1 * | 11/2020 | Volin | A01K 1/0353 |
| 2007/0056524 A1 * | 3/2007 | Barca | A01K 1/0245 119/496 |
| 2008/0105207 A1 * | 5/2008 | Gloor | A01K 1/0114 119/161 |
| 2009/0205578 A1 * | 8/2009 | Alves | A01K 31/07 119/454 |
| 2010/0192870 A1 * | 8/2010 | Wood | A01K 1/0245 29/428 |
| 2010/0282179 A1 * | 11/2010 | Ho | A01K 1/03 119/455 |
| 2014/0318469 A1 * | 10/2014 | Beasley | A01K 1/0245 119/497 |
| 2014/0366811 A1 * | 12/2014 | Tominaga | A01K 1/03 119/482 |
| 2016/0057968 A1 * | 3/2016 | Chandler | A01K 1/0245 119/497 |
| 2017/0164577 A1 * | 6/2017 | Baiocchi | A01K 1/02 |
| 2020/0390059 A1 * | 12/2020 | Liu | A01K 1/03 |
| 2021/0068372 A1 * | 3/2021 | Okawa | A01K 29/005 |
| 2022/0330517 A1 * | 10/2022 | Gevaert | A01K 1/0245 |

* cited by examiner

PET TRAVEL CARRIER

CROSS REFERENCE TO THE RELATED APPLICATIONS

This application claims priority based on Chinese patent application No. 202221235137.1 filed on May 20, 2022, the entire contents of which are hereby incorporated by reference.

TECHNICAL FIELD

The present disclosure belongs to the technical field of pet travel carriers, and specifically relates to a pet travel carrier.

BACKGROUND

Pet travel carriers are mostly used to carry or transport pets in a long journey. Keeping a pet in a pet travel carrier during carrying or transportation of the pet in a long journey can ensure the safety of the pet and prevent the pet from escaping and contacting with the outside world. During the use of a pet travel carrier in the prior art, generally a pet is directly put into the travel carrier, and a cushion or tray is additionally provided inside the travel carrier. When moving in the narrow space of the travel carrier, the pet is likely to be contaminated by its own excrement, causing many sanitation problems and making the space inside the travel carrier messy. In addition, the travel carrier in the prior art has an integrated box structure which could be opened from one end thereof. Such a travel carrier is bulky, and the messy space inside the travel carrier cannot be cleaned easily. Moreover, it is inconvenient for the user to move when the travel carrier in the prior art is carried or held by the user. The above technical deficiencies lead to the low practicability and infrequent use of the pet travel carrier in the prior art.

SUMMARY

An objective of the present disclosure is to overcome the deficiencies in the prior art and provide a portable, easy-to-clean and highly practical pet travel carrier.

To solve the above technical problems, the following technical solutions are employed in the present disclosure.

A pet travel carrier is provided, including an upper box, a lower box, and a base. The upper box and the lower box are detachably fixed and connected by a box fixing and connecting structure to form a hollow travel carrier body. The lower box and the base are detachably connected by a base connecting structure to form a travel carrier bottom structure. A door is arranged to extend through a first side of the upper box and a first side of the lower box. A tray which is removable is arranged on the base. A perforated plate is arranged at a lower part of the lower box exactly facing the tray. Rollers are arranged at a lower part of the base.

Further, the box fixing and connecting structure includes a box connecting structure and a box fixing structure arranged between the upper box and the lower box. The box connecting structure is a tenon and mortise structure arranged between the upper box and the lower box, and the tenon and mortise structure includes a plurality of cavities and a plurality of projections arranged at a connection between the upper box and the lower box and configured for engagement with each other; and the box fixing structure includes first through holes respectively arranged on two sides of the upper box, second through holes respectively arranged on two sides of the lower box and corresponding to the first through holes, and connectors, and the upper box is fixed and connected to the lower box by the connectors through the first through holes and the second through holes.

Further, the base connecting structure includes a plurality of hollow cylindrical protrusions and cone-shaped protrusions, the plurality of hollow cylindrical protrusions are arranged on a lower peripheral side of the lower box, side grooves are respectively arranged on two sides of the base, and the cone-shaped protrusions configured for engagement with the hollow cylindrical protrusions are arranged in the side grooves, and the lower box is connected to the base by the engagement and a connection of the hollow cylindrical protrusions with the cone-shaped protrusions.

Further, a plurality of ventilation holes are evenly distributed on three sides other than the first side of the upper box, an upper door frame is arranged on the first side of the upper box, a lower door frame is arranged on the first side of the lower box which is engaged with the upper box, and the door which extends through the first side of the upper box and the first side of the lower box is arranged in the upper door frame and the lower door frame.

Further, a first mounting hole is provided at an upper end of the upper door frame, a second mounting hole is provided at a lower end of the lower door frame, and the door is mounted between the upper door frame and the lower door frame through the first mounting hole and the second mounting hole.

Further, the tray is arranged directly below the perforated plate, and the tray has a removable structure and can be easily drawn out; and a recessed groove is provided on a front part of the tray, and a notch is provided at a position corresponding to the recessed groove on a front side of the base.

Further, an elongated groove is provided on each of two sides of the lower box to facilitate movement of the pet travel carrier.

Further, a handle is arranged on an upper part of the upper box, and a cylinder is arranged on a middle part of the handle.

Compared with the prior art, the present disclosure has the following advantages.

The tray is separated from the boxes in the present disclosure. The pet's excrement falls on the tray through holes of the perforated plate on the lower box, so that the environment inside the boxes can be kept clean.

The present disclosure has a simple structure which is easy to fabricate. The use of the tenon and mortise structure in combination with the connectors makes the pet travel carrier of the present disclosure easy to assemble and firm.

The detachable design of the hollow travel carrier body facilitates the disassembly of the travel carrier body for thorough cleaning of the inside of the travel carrier body. The detachable travel carrier bottom structure facilitates the disassembly of the bottom of the travel carrier for thorough cleaning. The removable tray structure is conducive to keeping the insides of the boxes clean during daily use.

The arrangement of the handle and the rollers makes the pet travel carrier easier to carry and move in the present disclosure.

Figure 1:
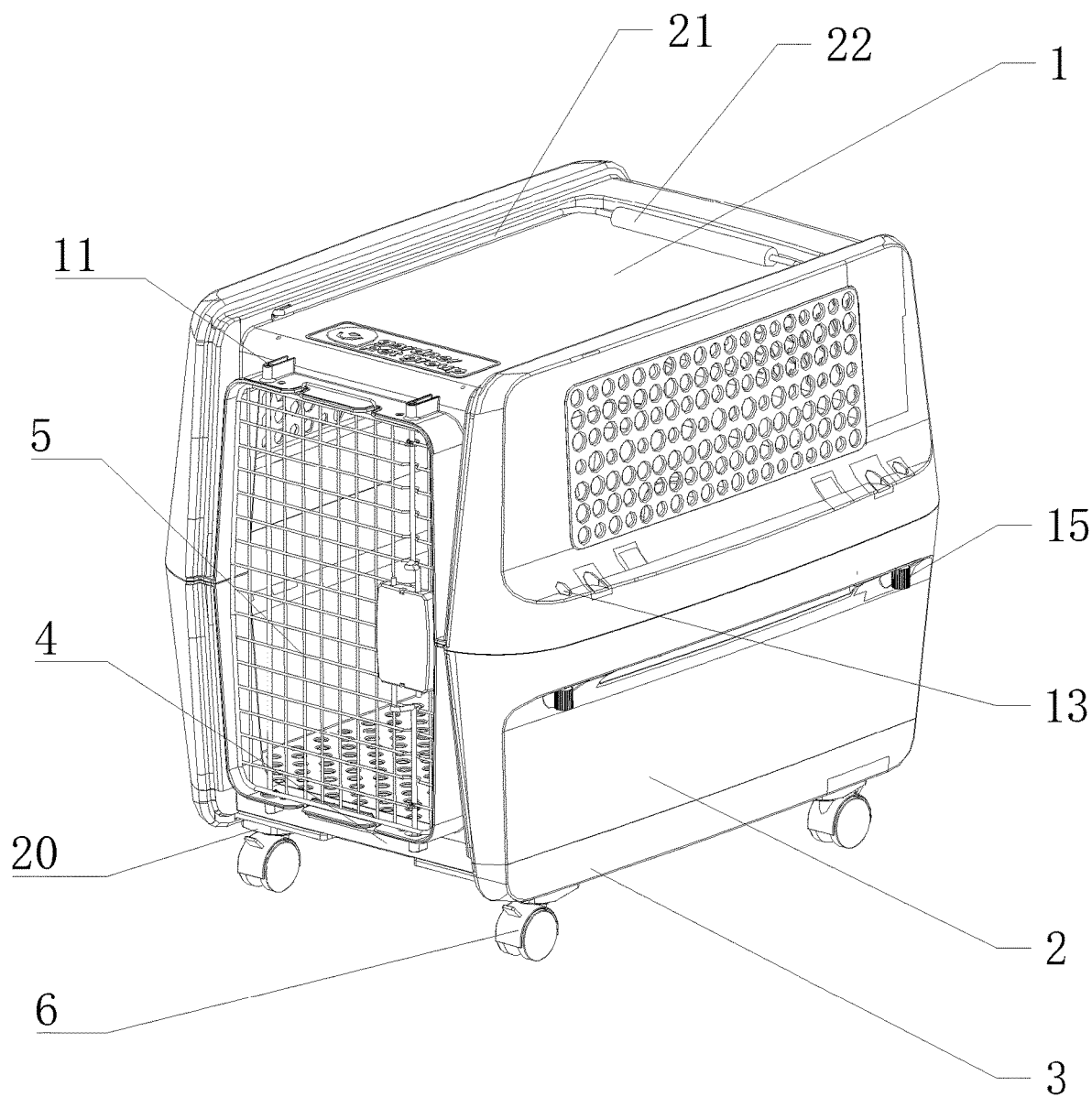
FIG. 1 is a schematic structural view of the present disclosure.

In the drawings: 1. upper box; 2. lower box; 3. base; 4. tray; 5. door; 6. roller; 7. upper door frame; 8. lower door frame; 9. cavity; 10. projection; 11. first mounting hole; 12. second mounting hole; 13. first through hole; 14. second through hole; 15. connector; 16. cylindrical protrusion; 17. side groove; 18. cone-shaped protrusion; 19. mounting part; 20. mounting block; 21. handle; 22. cylinder; 23. recessed groove; 24. notch; 25. elongated groove.

DETAILED DESCRIPTION OF THE EMBODIMENTS

In order to enable those skilled in the art to better understand the solutions of the present disclosure, the technical solutions in the embodiments of the present disclosure will be described clearly and fully with reference to the accompanying drawings in the embodiments of the present disclosure below.

Figure 2:
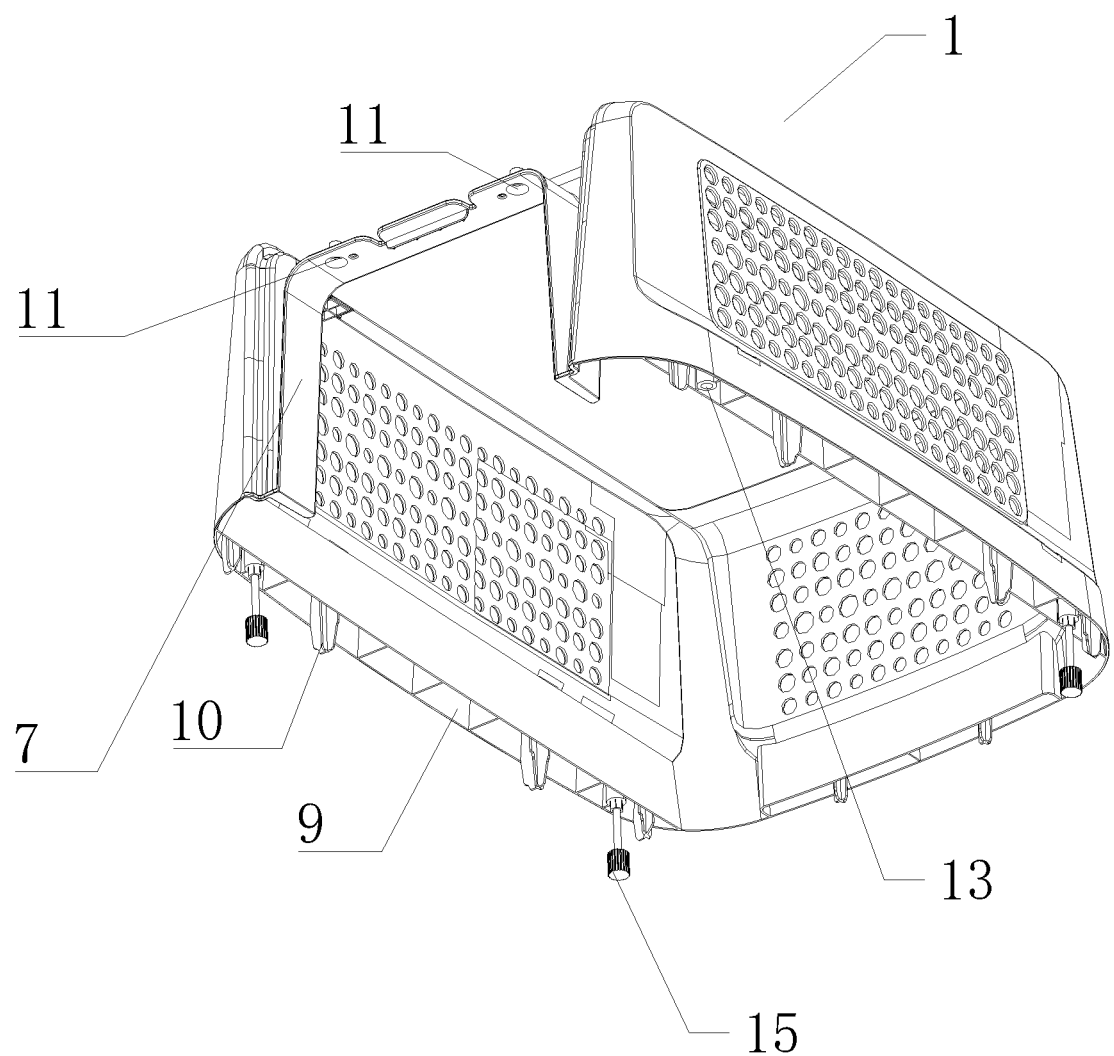
FIG. 2 is a schematic structural view of an upper box of the present disclosure.
Figure 3:
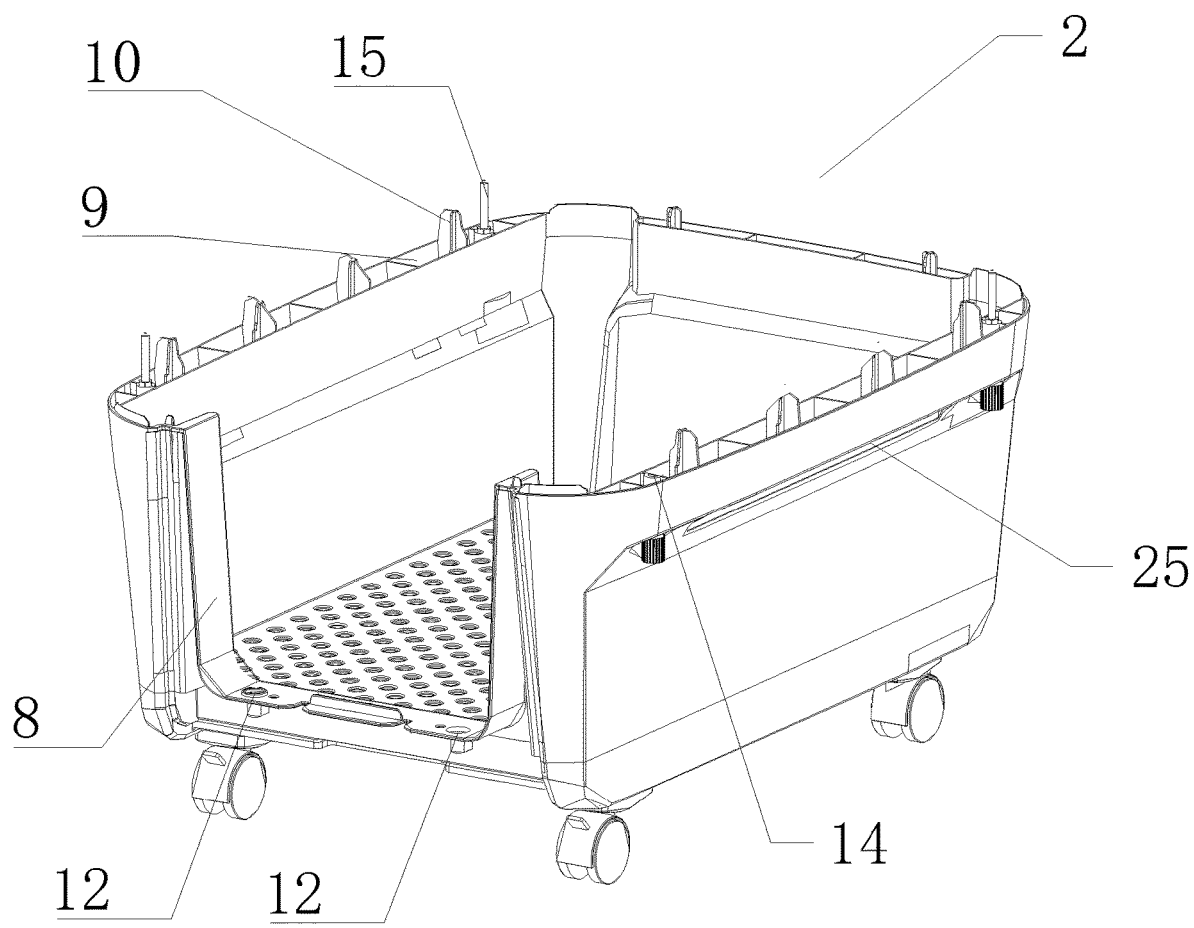
FIG. 3 is a schematic structural view of a lower box of the present disclosure.
Figure 4:
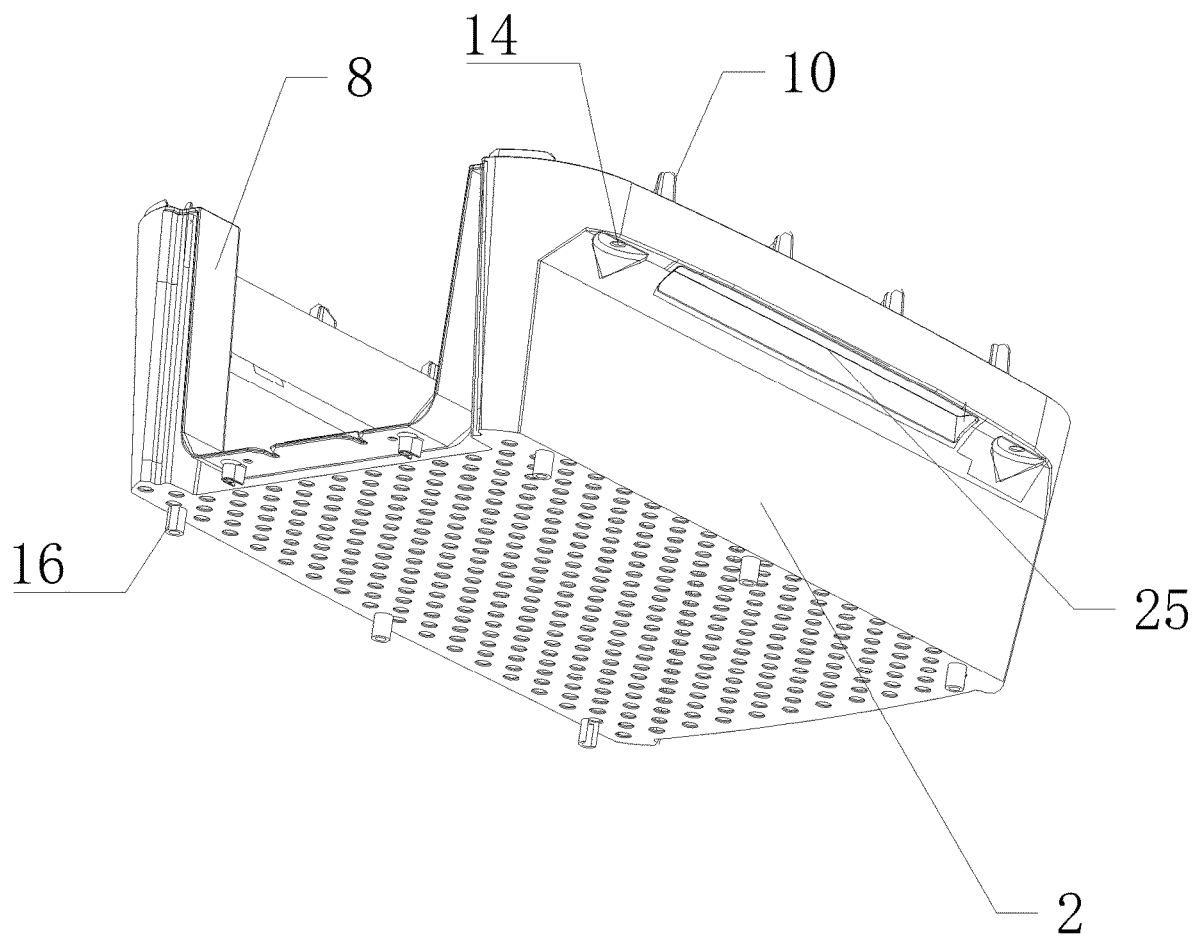
FIG. 4 is a schematic structural view of the lower box of the present disclosure.
Figure 5:
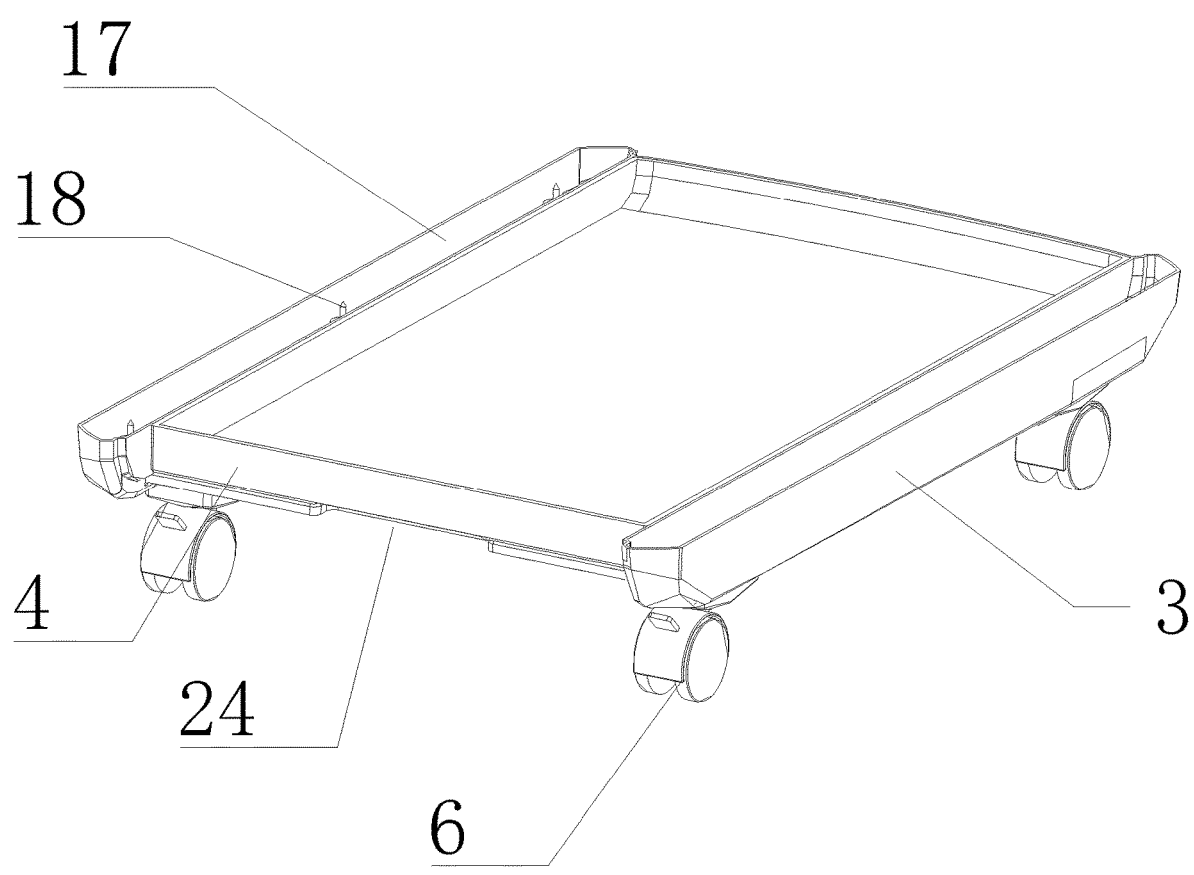
FIG. 5 is a schematic structural view of a base of the present disclosure.
Figure 6:
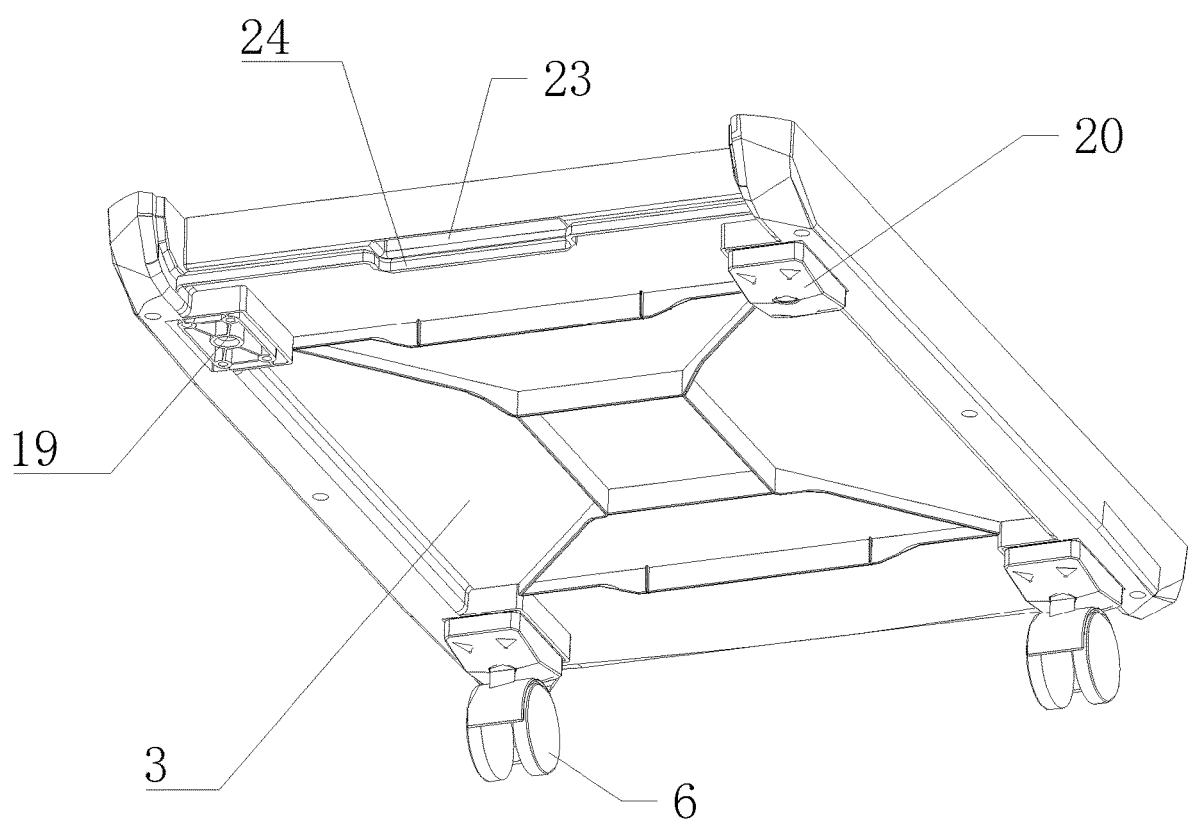
FIG. 6 is a schematic structural view of the base of the present disclosure.

As shown in FIG. 1 to FIG. 6, a pet travel carrier includes an upper box 1, a lower box 2, a base 3, a tray 4, a door 5, and rollers 6. The upper box 1 and the lower box 2 are fixed and connected to form a hollow travel carrier, of which the hollow space is configured to accommodate a pet. A plurality of ventilation holes are evenly distributed on three sides other than a first side of the upper box 1. An upper door frame 7 is arranged on the first side of the upper box 1. A lower door frame 8 is arranged on a side of the lower box 2 which is engaged with the upper box 1. The door 5 is arranged in the upper door frame 7 and the lower door frame 8. A lock is arranged on the door 5.

A handle 21 is arranged on an upper part of the upper box 1, and a cylinder 22 is arranged on a middle part of the handle. The handle 21 is configured to pull the travel carrier during movement, and the cylinder 22 makes the handle 21 more convenient to use. A perforated plate is arranged at a lower part of the lower box 2. A plurality of holes are provided on the perforated plate, and the pet's excrement can fall down through the holes.

The lower box 2 is fixedly mounted on an upper part of the base 3. The tray 4 is arranged between the base 3 and the lower box 2. The tray 4 is configured to receive the pet's excrement falling from the lower box 2. The rollers 6 are respectively arranged at four bottom corners of the base 3. The rollers 6 make it easier for the pet travel carrier to move on the flat ground.

Further, a tenon and mortise structure is arranged between the upper box 1 and the lower box 2. The tenon and mortise structure includes a plurality of cavities 9 and a plurality of projections 10 configured for engagement with each other. The cavities 9 and the projections 10 facilitate the connection between the upper box 1 and the lower box 2, and make their positions easy to calibrate.

Further, a first mounting hole 11 is provided at an upper end of the upper door frame 7, a second mounting hole 12 is provided at a lower end of the lower door frame 8, and the door 5 is mounted between the upper door frame 7 and the lower door frame 8 through the first mounting hole 11 and the second mounting hole 12. A hinge pillar is arranged on the door 5. The hinge pillar is mounted into the first mounting hole 11 and the second mounting hole 12.

Further, first through holes 13 are respectively arranged on two sides of the upper box 1, second through holes 14 are respectively arranged on two sides of the lower box 2 and corresponding to the first through holes 13, and the upper box 1 is fixed and connected to the lower box 2 by connectors 15 through the first through holes 13 and the second through holes 14. A knob which facilitates tightening and disassembly is arranged at a lower surface of each of the connectors 15.

Further, a plurality of hollow cylindrical protrusions 16 are arranged on a lower peripheral side of the lower box 2, side grooves 17 are respectively arranged on two sides of the base 3, and cone-shaped protrusions 18 configured for engagement with the hollow cylindrical protrusions 16 are arranged in the side grooves 17. The base 3 can be connected to the lower box 2 by inserting the cone-shaped protrusions 18 into the hollow positions of the hollow cylindrical protrusions 16.

Further, mounting parts 19 are arranged at a lower part of the base 3, a lower part of each of the mounting parts 19 is connected to a mounting block 20, and each of the rollers 6 is connected to the bottom through the mounting block 20.

Further, a recessed groove 23 is provided on a front part of the tray 4. The recessed groove 23 makes it convenient for the user to put the tray 4 into the base 3 or draw the tray 4 out of the base 3, so as to clean up the pet's excrement or other litter. A notch 24 is provided at a position corresponding to the recessed groove 23 on a front part of the base 3. The recessed groove 23 is exposed through the notch 24, to further facilitate the operation of drawing out the tray 4.

Further, an elongated groove 25 is provided on each of two sides of the lower box 2 to facilitate movement of the pet travel carrier.

It should be understood that the above embodiments are only example embodiments for illustrating the principles of the present disclosure, but the present disclosure is not limited thereto. Those having ordinary skill in the art can make various changes and modifications without departing from the spirit and scope of the present disclosure. Such changes and modifications also fall within the protection scope of the present disclosure.

What is claimed is:

1. A pet travel carrier, comprising an upper box, a lower box, and a base, wherein
   the upper box and the lower box are detachably fixed and connected by a box fixing and connecting structure to form a hollow travel carrier body,
   the lower box and the base are detachably connected by a base connecting structure to form a travel carrier bottom structure,
   a door is arranged to extend through a first side of the upper box and a first side of the lower box,
   a tray is removable and is arranged on the base,
   a perforated plate is arranged at a lower part of the lower box exactly facing the tray, and
   rollers are arranged at a lower part of the base, wherein
   the box fixing and connecting structure comprises a box connecting structure and a box fixing structure arranged between the upper box and the lower box, wherein
   the box connecting structure is a tenon and mortise structure arranged between the upper box and the lower box, and
   the tenon and mortise structure comprises a plurality of cavities and a plurality of projections arranged at a connection between the upper box and the lower box and configured for engagement with each other; and the box fixing structure comprises first through holes respectively arranged on two sides of the upper box, second through holes respectively arranged on two sides of the lower box and corresponding to the first through holes, and connectors, wherein the upper box is fixed and connected to the lower box by the connectors through the first through holes and the second through holes.

2. A pet travel carrier, comprising an upper box, a lower box, and a base, wherein the upper box and the lower box are detachably fixed and connected by a box fixing and connecting structure to form a hollow travel carrier body, the lower box and the base are detachably connected by a base connecting structure to form a travel carrier bottom structure, a door is arranged to extend through a first side of the upper box and a first side of the lower box, a tray is removable and is arranged on the base, a perforated plate is arranged at a lower part of the lower box exactly facing the tray, and rollers are arranged at a lower part of the base, wherein the base connecting structure comprises a plurality of hollow cylindrical protrusions and cone-shaped protrusions, wherein the plurality of hollow cylindrical protrusions are arranged on a lower peripheral side of the lower box, side grooves are respectively arranged on two sides of the base, the cone-shaped protrusions configured for engagement with the plurality of hollow cylindrical protrusions are arranged in the side grooves, and the lower box is connected to the base by the engagement and a connection of the plurality of hollow cylindrical protrusions with the cone-shaped protrusions.

3. The pet travel carrier according to claim 1, wherein a plurality of ventilation holes are evenly distributed on three sides other than the first side of the upper box, an upper door frame is arranged on the first side of the upper box, a lower door frame is arranged on the first side of the lower box engaged with the upper box, and the door extends through the first side of the upper box and the first side of the lower box and is arranged in the upper door frame and the lower door frame.

4. The pet travel carrier according to claim 3, wherein a first mounting hole is provided at an upper end of the upper door frame, a second mounting hole is provided at a lower end of the lower door frame, and the door is mounted between the upper door frame and the lower door frame through the first mounting hole and the second mounting hole.

5. The pet travel carrier according to claim 1, wherein a recessed groove is provided on a front part of the tray, and a notch is provided at a position corresponding to the recessed groove on a front side of the base.

6. The pet travel carrier according to claim 1, wherein an elongated groove is provided on each of two sides of the lower box.

7. The pet travel carrier according to claim 6, wherein a handle is arranged on an upper part of the upper box, and a cylinder is arranged on a middle part of the handle.

8. The pet travel carrier according to claim 1, wherein a plurality of ventilation holes are evenly distributed on three sides other than the first side of the upper box, an upper door frame is arranged on the first side of the upper box, a lower door frame is arranged on the first side of the lower box engaged with the upper box, and the door extends through the first side of the upper box and the first side of the lower box and is arranged in the upper door frame and the lower door frame.

9. The pet travel carrier according to claim 1, wherein a plurality of ventilation holes are evenly distributed on three sides other than the first side of the upper box, an upper door frame is arranged on the first side of the upper box, a lower door frame is arranged on the first side of the lower box engaged with the upper box, and the door extends through the first side of the upper box and the first side of the lower box and is arranged in the upper door frame and the lower door frame.

10. The pet travel carrier according to claim 1, wherein an elongated groove is provided on each of two sides of the lower box.

* * * * *